United States Patent
Griffith et al.

(10) Patent No.: US 11,768,850 B2
(45) Date of Patent: Sep. 26, 2023

(54) METHOD FOR AUTOMATED QUERY LANGUAGE EXPANSION AND INDEXING

(71) Applicant: Sisense Inc., Ramat Gan (IL)

(72) Inventors: Steven Griffith, San Diego, CA (US); Ilge Akkaya, Palo Alto, CA (US); Audrey McGowan, New York, NY (US); Chris Tice, San Francisco, CA (US); Jason Freidman, San Francisco, CA (US); Jeff Watts, Albany, CA (US)

(73) Assignee: SISENSE SF, INC., San Francisco, CA (US)

( * ) Notice: Subject to any disclaimer, the term of this patent is extended or adjusted under 35 U.S.C. 154(b) by 0 days.

(21) Appl. No.: 17/643,686

(22) Filed: Dec. 10, 2021

(65) Prior Publication Data

US 2022/0100775 A1 Mar. 31, 2022

Related U.S. Application Data

(63) Continuation of application No. 16/452,338, filed on Jun. 25, 2019, now Pat. No. 11,250,018.

(51) Int. Cl.
*G06F 16/00* (2019.01)
*G06F 16/25* (2019.01)
*G06F 16/242* (2019.01)
*G06F 16/22* (2019.01)

(52) U.S. Cl.
CPC ........ *G06F 16/258* (2019.01); *G06F 16/2228* (2019.01); *G06F 16/2433* (2019.01)

(58) Field of Classification Search
None
See application file for complete search history.

(56) References Cited

U.S. PATENT DOCUMENTS

| | | | | |
|---|---|---|---|---|
| 6,507,813 | B2 * | 1/2003 | Veditz | G06F 40/197 |
| | | | | 717/137 |
| 7,827,523 | B2 * | 11/2010 | Ahmed | G06F 16/28 |
| | | | | 717/106 |
| 8,291,376 | B2 | 10/2012 | Seitz et al. | |
| 8,311,998 | B2 | 11/2012 | Correll, Jr. | |
| 9,922,065 | B2 | 3/2018 | Swan et al. | |
| 10,235,402 | B1 * | 3/2019 | Franklin | G06F 16/2228 |
| 10,366,247 | B2 | 7/2019 | Beecham et al. | |
| 10,858,674 | B2 | 12/2020 | Sarks et al. | |

(Continued)

FOREIGN PATENT DOCUMENTS

| | | | | |
|---|---|---|---|---|
| CN | 110633331 A | * | 12/2019 | ......... G06F 16/2452 |
| CN | 111026735 A | * | 4/2020 | ........... G06F 16/214 |

OTHER PUBLICATIONS

Design, Implementation and Testing of Extended and Mixed Precision BLAS, Li et al., (Year: 2002).*

(Continued)

*Primary Examiner* — Jean M Corrielus
(74) *Attorney, Agent, or Firm* — M&B IP Analysts, LLC

(57) ABSTRACT

In an embodiment, a query system sends compact code to a database service for expansion of the compact code to partially-expanded code and expanded code. In an embodiment, a hash value is generated based on the partially-expanded code and indexed in memory with the expanded code. In an embodiment, a hash value is received as part of a command and expanded code is identified based on the hash value and sent to a database service.

17 Claims, 11 Drawing Sheets

(56) References Cited

U.S. PATENT DOCUMENTS

| | | |
|---|---|---|
| 11,237,585 B2 | 2/2022 | Dorta-Quiñones |
| 11,409,758 B2 | 8/2022 | Robichaud |
| 2002/0177993 A1 | 11/2002 | Veditz et al. |
| 2007/0198484 A1* | 8/2007 | Ahmed .................... G06F 16/28 |
| 2018/0074870 A1 | 3/2018 | Park et al. |
| 2018/0075107 A1 | 3/2018 | Park et al. |
| 2018/0075125 A1 | 3/2018 | Stiel et al. |
| 2018/0075163 A1 | 3/2018 | Park et al. |
| 2018/0307857 A1* | 10/2018 | Beecham ............ G06F 16/9024 |
| 2020/0073972 A1 | 3/2020 | Busjaeger et al. |
| 2020/0125572 A1 | 4/2020 | Hanckel et al. |
| 2020/0201813 A1 | 6/2020 | Gandhi |
| 2020/0252404 A1* | 8/2020 | Padmanabhan ..... G06F 16/2308 |
| 2020/0341965 A1* | 10/2020 | Gupta ................. G06F 16/2282 |
| 2020/0409972 A1 | 12/2020 | Samad-Yahaya et al. |
| 2021/0152364 A1 | 5/2021 | Beecham et al. |
| 2022/0121678 A1* | 4/2022 | Griffith ............... G06F 16/2433 |

OTHER PUBLICATIONS

Joe-E A Security-Oriented Subset of Java, Mettler et al., (Year: 2011).*

PADS—A Domain-Specific Language for Processing Ad Hoc Data, Fisher et al., (Year: 2005).*

Generation—Augmented Query Expansion For Code Retrieval (Li et al.,) (Year: 2022).*

Query Expansion Using Word Embeddings (Suki et al.,) (Year: 2016).*

Garmendia et al., "Automated Variability Injection for Graphical Modelling Languages", 2020 Association for Computing Machinery: GPCE'20, Nov. 16-17, 2020, Virtual, USA.

* cited by examiner

METHOD FOR AUTOMATED QUERY LANGUAGE EXPANSION AND INDEXING

CROSS-REFERENCE TO RELATED APPLICATIONS; BENEFIT CLAIM

This application is a continuation of U.S. patent application Ser. No. 16/452,338 filed on Jun. 25, 2019, now allowed. This application is also related to U.S. patent application Ser. No. 16/452,514, now pending, assigned to the common assignee.

The contents of the above-referenced applications are hereby incorporated by reference.

TECHNICAL FIELD

The present disclosure relates to database systems and, more specifically, to techniques for using tokenized, expanded, and partially-expanded code when responding to requests for data stored in various database systems utilizing various architectures.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database and data storage systems are often employed in modern networking systems to facilitate sharing of data between multiple users or entities. An entity attempting to access data which is not stored locally will often request access to that data which is stored on another entity through a network or other connection. Requests for access to data over the network, or "queries," are often sent in a format comprising syntactically structured computer code. The queries are sent from a first computer system requesting the data to a second computer system housing the desired data. The second system will then parse the computer code comprising the query and determine the storage location of the desired data before retrieving the data and sending the data back over the network to the first system. The second system may use a specific computer architecture such that a query from the first computer system must comprise a very specific format or data sequence.

The reliance of database and data storage systems on contemporary procedures to request, find, and transfer data in a particular architecture using standard code-based procedures gives rise to potential procedural bottlenecks in data sharing. The sending and reception of data depends on a system's ability to create and interpret the computer code comprising the queries in an efficient manner. Queries comprising full and unedited computer code often consume a significant amount of digital storage space. When such code is sent between systems over a network, the size of the code may consume an undesirably large amount of network bandwidth. In some cases, the computer code comprising a query may be several magnitudes larger than a system is capable of processing. Queries to a computer system utilizing a specific architecture must sometime be translated to fit those architecture requirements before they can be properly received. As a result, queries are frequently retranslated to fit multiple computer architecture, consuming additional time and resources.

In these circumstances, a system may simply discard the query or overload any remaining memory by attempting to parse the query, leading to various problematic scenarios including system shutdowns, errors, and/or lost data, all of which disrupt the workflow of the systems and slow all entities connected to it. In many cases, a transfer of data that is interrupted before completion results in the corruption or loss of data, forcing the transfer process to begin anew. Such crashes waste time and computing resources consumed during the initial transfer attempt and further waste future time and bandwidth while attempting at least a second remedial transfer.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein that allow the utilization of compact computer code for efficient sending and receiving of data between database systems utilizing multiple architectures. Compact computer code is an annotated or compressed version of regular computer code and is designed to require as few computing resources as possible to represent a database query or command. Replacement of regular computer code with compact computer code in computer operations results in a smaller resource requirement when transferring the code between systems with the added benefit that expansion may be done to fit a multitude of computer architectures.

A computer system recognizes compression rules relating to the compact computer code and the corresponding regular, expanded, computer code. The computer system decompresses received compact computer code into expanded computer code after it has been transferred through a network, saving valuable computer resources and bandwidth during the transmission phase, while still retaining the ability to use the expanded computer code once it has been decompressed. In various embodiments, a compact computer code has multiple recurring instances of a section of compact code. The computer system elects to decompress only the first recurring instance in the compact computer code, resulting in a partially-expanded computer code which is more functional than the compact computer code, but utilizes fewer computing resources than the expanded computer code. The partially-expanded code is used in place of the expanded computer code in various computer activities, such as hash value generation, in order to preserve computer resources while maintaining full functionality. Additionally, the expansion of compact code to expanded code allows for "parameterization," which is the replacement of sections of compact code with expanded code corresponding to a specific computer architecture. Parameterization allows the expansion of a singular instance of compact code to multiple instances of expanded code that is functional on multiple computer architectures. As a result, fully expanded code need to be translated from scratch to multiple formats befitting multiple architectures. Instead, the compact code need only be expanded according to parameterization rules specifying the computer architecture on which the expanded code will be executed and recognized by the system.

Code Expansion System

Figure 1:
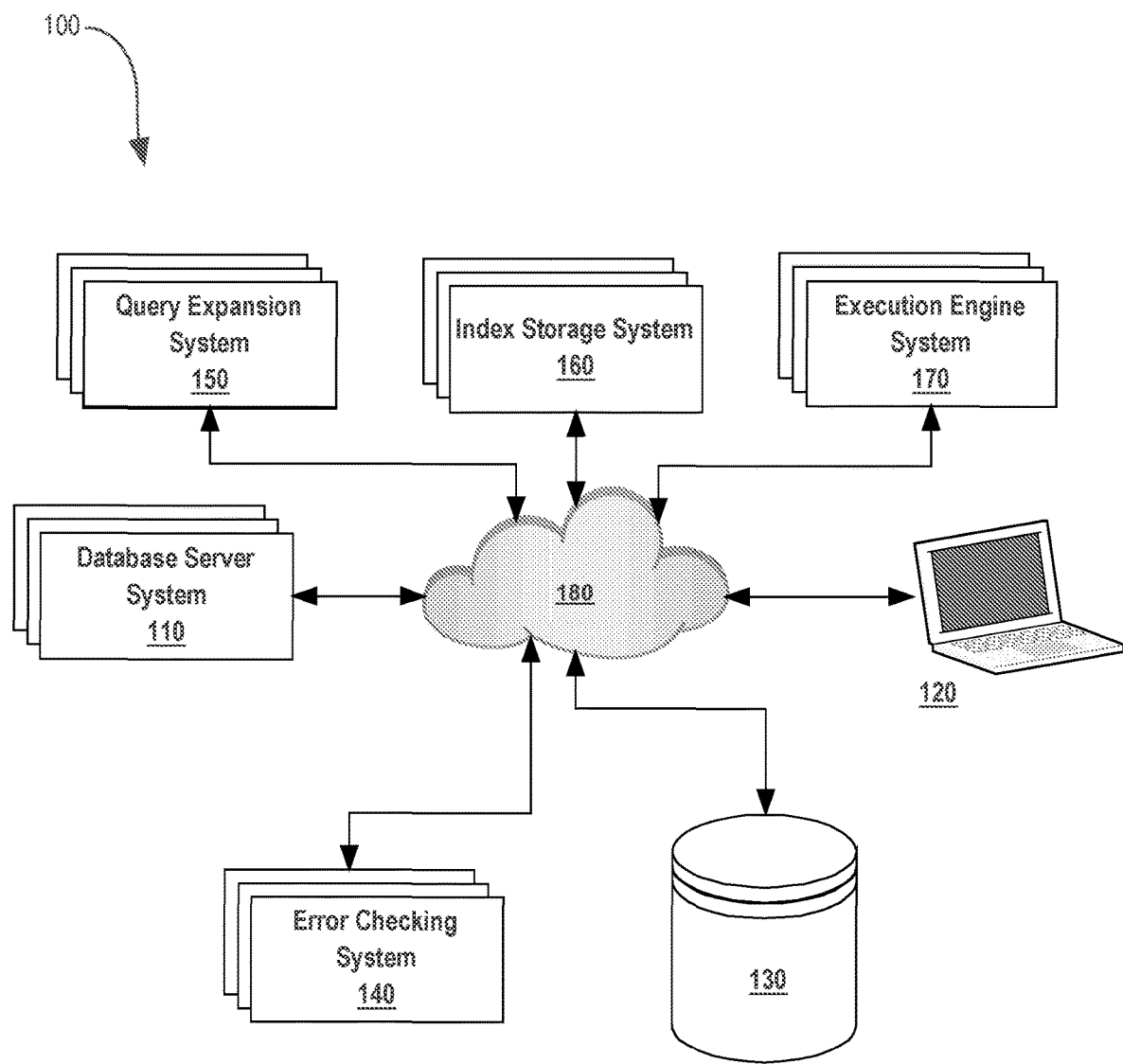
FIG. 1 illustrates a system that may be used to implement an embodiment.
Figure 2:
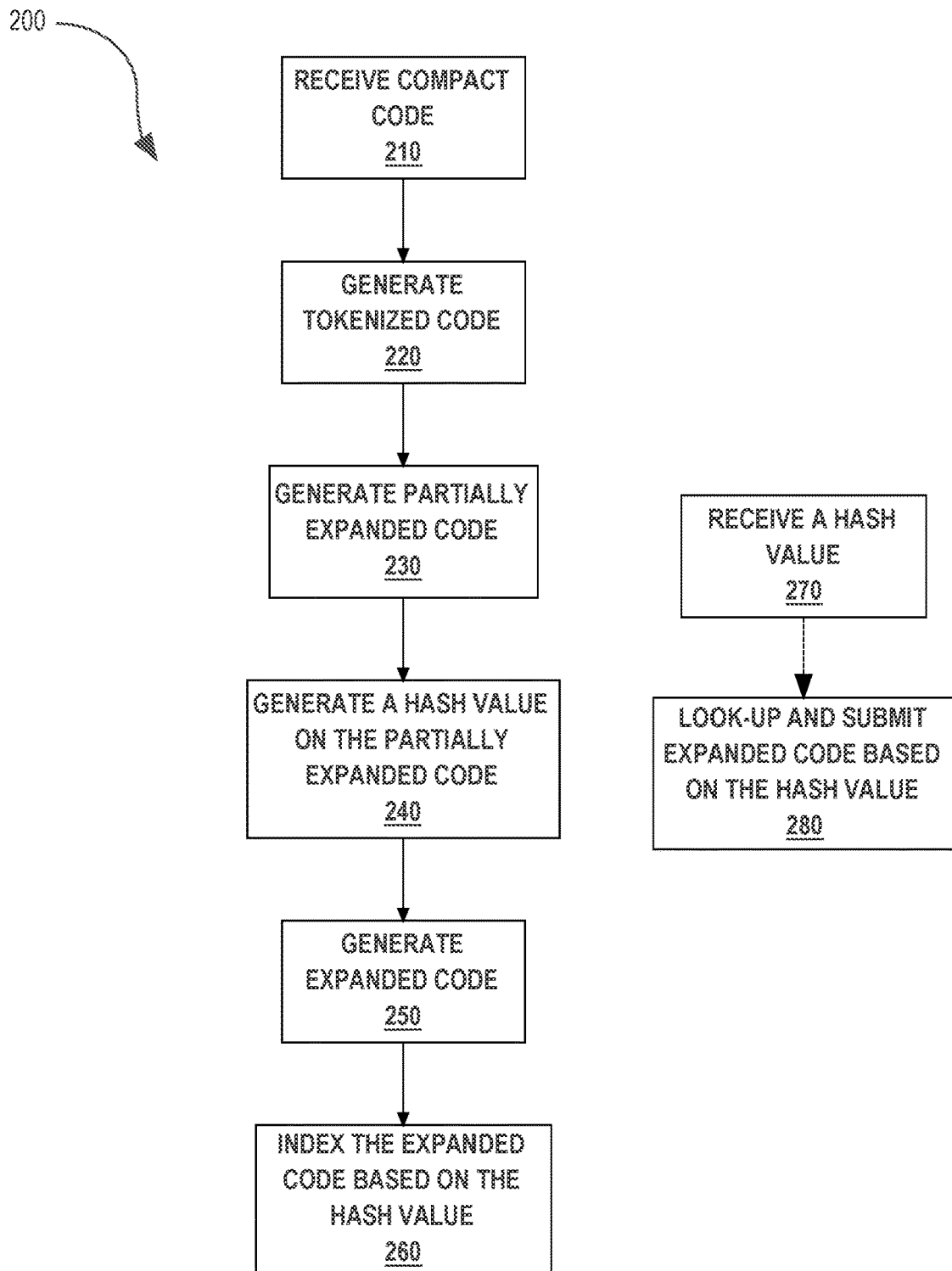
FIG. 2 illustrates an example process that may govern the operation of an embodiment.

FIG. 1 illustrates a system that may be used to implement an embodiment. In various embodiments, process 200 depicted in FIG. 2 is carried out by the example system 100 using any combination of the system's components. Multiple systems 110-170 are connected by a network 180. Network 180 is any appropriate local area network, internet, and/or other types of networks or communication mechanisms, including those discussed herein. Coupled to network 180 is database server system 110. Database server system 110 is a database containing data items which are sought by a separate system as part of process 200.

Database server system 110 is in communication over network 180 with storage device 130. Storage device 130 is any device or group of devices capable of storing data or information. Connection of the storage device 130 to the system 100 through network 180 means that storage device 130 may be used in the alternative to any other system or device described herein which utilizes memory to store data. Database server system 110 and storage device 130 is in connection over network 180 with client device 120. Client device 120 is any device utilized by a user, which sends compact code as part of a query to obtain data from database server system 110. Error checking system 140 is communicatively coupled to network 180 and is any service, software, service or entity capable of performing error checking operations on the expansion of compact and tokenized code as described herein.

Query expansion system 150 is coupled to network 180. Query expansion system 150 is responsible for the expansion of compact code, tokenized code or any other expansion process described herein, such those described in process step 220, 230 or 250. Index storage system 160 is coupled to network 180. Index storage system is responsible for indexing, in memory, an expanded code along with a generated hash value. Execution engine system 170 is communicatively coupled to network 180. Execution engine system 170 is responsible for executing expanded code to retrieve data stored in database server system 110. In various embodiments, in response to executing the expanded code, execution engine system 170 receives the data items sought by the query and send the data items to client device 120. In various embodiments, each of the described systems, devices, or networks may be separate or integrated in any combination, including multiple partitions of a computer memory stored on one or more computing devices.

Code Expansion Process

FIG. 2 illustrates an example process 200 that governs operation of an embodiment. At step 210, the query expansion system 150 receives compact code from client device 120. The compact code is any computer generated and/or readable code as described herein. For example, compact code is generated by a user utilizing a software application on client device 120, which selects or generates compact code manually for the purpose of retrieving information from the database server system 110.

The compact code sent from the client device 120 to the query expansion system 150 comprises computer code which may specify the nature, type, location, category, format, or any other aspects of the data sought by the query. In various embodiments, the compact code comprising the query contains "string" data, representing groupings of alphanumeric characters forming recognizable and parsable data for a computer system. The query expansion system 150 receives, parses and interprets the computer code as containing one or more of a plurality of strings. The plurality of strings may comprise multiple strings which have the same grouping and/or format of alphanumeric characters, making them identical strings.

The expansion of compact code to expanded code comprises a tokenization action for converting the compact code to tokenized code and a second expansion action for converting the tokenized code to expanded code. Tokenization involves the replacement of the one or more compact strings in the compact code with data snippets or "tokens." Each compact string in the compact code corresponds to a token and each token further corresponds to an expanded string in the expanded code. At step 220, the query expansion system 150 generates tokenized code based on the received compact code. The final structure of the tokenized code depends on the structure of the compact strings in the compact code and a set of tokenization rules specified in the query expansion system 150. The tokenization rules are a set of correspondence instructions specifying which particular compact strings will be replaced with a particular token during tokenization.

For example, the query expansion system has tokenization rules mapping a first compact string found in compact code to a first corresponding token, and subsequently "tokenizes" the first compact string in a received compact code by replacing some or all instances of the first compact string with instances of the first corresponding token. The tokenization of code is described in further detail herein, specifically at FIG. 4.

The one or more tokens additionally correspond to one or more expanded strings which together make up expanded code. Tokenized code is further expanded according to additional tokenization rules in the query expansion system 150, which specifies the replacement rules of a particular token in the tokenized code with a particular expanded string corresponding to the particular token.

Generating Partially-Expanded Code

At step 230, the query expansion system 150 generates partially-expanded code. The partially-expanded code is code which contains some expanded strings, and some tokens. The generation of partially-expanded code involves the creation of unique code, or the modification of the tokenized code, in which a subset of the tokens in the tokenized code are replaced with expanded strings. Replacing the tokenized code with expanded strings via parameterization allows expanded string corresponding to a specific computer architecture to replace the tokenized code, depending on the architecture that the partially expanded code and/or expanded code are to be sent to.

In various embodiments, partially-expanded code comprises code in which at least the first instance of each different token in the tokenized code has been replaced by the corresponding expanded string. In various further embodiments, only the first instance of token data in tokenized code is replaced by corresponding expanded data and subsequent instances are left as tokens. For example, once a token in the tokenized code is replaced with an expanded string, all other instances of the same token will be left as tokens to complete the partially-expanded string. The partial-expansion action is discussed in further detail here, specifically in FIG. 5B.

Generating a Hash Value for the Expanded Code Based on the Partially-Expanded Code In order to execute the expanded code to retrieve data from the database server system 110, expanded code must be executed on the execution engine system 170. Storing expanded code in the index storage system 160 allows for quick retrieval of the expanded code without the need to expand the compact code to expanded code during each query.

At step 240, the query expansion system generates a hash value on the partially expanded code. A hash value is any value that is derived from the application of a function, having a numerical value as output, to the partially-expanded code. For example, a hash value is derived from a hash function performed on all or a portion of the partially-expanded code in which the characters comprising the code are converted to corresponding American Standard Code for Information Interchange (ASCII) integer values, and the hash value is the resulting modulus of the summation of the values. The partially-expanded code's smaller size allows the generation of a hash value faster and more efficiently than the generation of a hash value on similar expanded code, making the hash value based on the partially-expanded code more efficient for storing objects.

The index storage system 160 contains mapped data objects associating stored expanded code with corresponding hash values. Once a hash value for the partially-expanded code is generated, the query expansion system communicates with the index storage system to determine if expanded code is stored therein by searching for the generated hash value. If the generated hash value is not present on the index storage system 160, the compact code has not previously been expanded and stored with the generated hash value.

Generating Expanded Code

At step 250, the query expansion system 150 generates expanded code to be stored in the index storage system 160. The generation of expanded code involves the creation of unique code, or the modification of the tokenized code, in which tokens in the tokenized code are replaced with expanded strings.

In various embodiments, expanded code comprises code in which every token in the tokenized code has been replaced by the corresponding expanded string, including multiple instances of the same token. The expansion action is discussed in further detail here, specifically in FIG. 5A. As discussed above, parameterization allows the replacement of tokenized code with expanded strings corresponding to a computer architecture. The use of particular expanded strings in the replacement of tokenized code is dependent on the computer architecture of a system which will ultimately utilize the expanded code.

Indexing the Expanded Code Based on the Hash Value

At step 260, the expanded code which has been generated at step 250 and the hash value which has been generated at step 240 are sent from query expansion system 150 to the index storage system 160. Index storage system 160 indexes the expanded code based on the hash value in a mapping data object, which associates a piece of data such as the expanded code with a numerical value, such as the hash value. Entities attempting to retrieve the data from the mapping data object use the numerical value to find and return the data.

In various embodiments, the expanded code is indexed at a location in computer memory on the index storage system based, at least in part, on the calculation of the hash value. Such an index may be a hash-value-to-expanded-code index which maps the calculated hash value to the instance of the expanded code. For example, if the hash value is calculated based on a hash function utilizing a modulus of the summation of the ASCII values and the number of storage locations, the expanded code is indexed in one of the numbers of storage locations corresponding to the resulting hash value.

Because the compact code is parameterized, multiple instances of expanded code performing similar functions but designed to be utilized by different computer architectures may exist. Multiple instances of the expanded code may be indexed on the same hash value for retrieval and use on a computer system utilizing a computer architecture corresponding to the retrieved expanded code.

Retrieving the Expanded Code with a Hash Value

Once the expanded code has been indexed based on the hash value generated on the partially-expanded code, applications seeking to utilize the expanded code may send a query comprising a hash value to retrieve the expanded code. For example, a client device 120 seeking access to the expanded code may send to the index storage system a hash value generated on the client device 120 which is mapped to expanded code in the index storage system. In the alternative, a client device 120 may send compact code in order to retrieve expanded code. In this case, the compact code is expanded to partially-expanded code, the hash value is generated as described above, and the index storage system 160 finds the indexed expanded code in memory. Depending on the goal of retrieving the expanded code, the expanded code may be sent back to user device 120, to the execution engine 170, or to the error checking system 140.

At step 270, a hash value is received from the client device 120. In various embodiments, the received hash value is sent along with other data, either separately or in combination. For example, the client device 120 requesting expanded code from the index storage system 160 may also send additional data such as a request for confirmation that a hash value was received by the index storage system.

At step 280, indexed expanded code is looked-up based on the received hash value at the index storage system 160. The look-up action is a memory search, a query, or any action sufficient to identify and/or access expanded code corresponding to the received hash value. If specific expanded code designed to run on a system employing a specific computer architecture is sought, the look-up may return only the expanded code which will be utilized on that system. After the look-up is completed and the expanded code mapped to the received hash value has been identified, the expanded code is submitted to one or more devices to fulfill a purpose specified by the user of the client device 120. A user requesting the expanded code only to review its contents may have the expanded code to be sent back to client device 120 only. A user requesting that the expanded code be executed to retrieve data from the database server system 110 may cause the expanded code to be sent to execution engine system 170, where the code will be executed to find and return data item(s) from the database server system 110. If the system 100 determines that an error has occurred during any of the steps of process 200, the system may independently opt to send the compact, partially-expanded, or expanded code to error checking system 140. Discussion of the error checking process is discussed in further detail in FIG. 6.

In various embodiments, not pictured in FIG. 2, process 200 proceeds automatically and independent of any direct user actions at client device 120. For example, a scheduling component device may routinely direct a computing device to send compact code to a database server at regular intervals to improve the catalog of expanded code in the index storage system 160. In various further embodiments, an independent computing device or software application automatically sends a hash value to the index storage system 160 to retrieve from the database memory a corresponding expanded code for analysis.

In various embodiments, not pictured in FIG. 2, an entity performs multiple instances of process 200 concurrently using parallel programming. In various embodiments not pictured in FIG. 2, the tokenization or expansion processes may concurrently expanded code into multiple formats executable on multiple computer architectures. For example, subsequent to tokenizing compact code written in a first programming language, tokenization transformation rules cause the generation of expanded code written in a second programming language. In various further embodiments, generating expanded code further comprises generating two or more instances of expanded code, wherein each of the two or more different instances of expanded code are written in different programming languages. In various further embodiments, indexing the expanded code based on the hash value comprises expanding and indexing multiple versions of the expanded code written in different programming languages concurrently to preempt a subsequent expansion of the various programming languages designed to run on multiple computer architectures.

In various embodiments not pictured in FIG. 2, generation of tokenized data, partially-expanded code or expanded code additionally comprises appending or deleting segments of compact code, tokens, segments of expanded code or any other data to the various codes code. In various embodiments, the generation of a hash value further comprises generating a hash value on the partially expanded code including at least a first hash filter rule. The hash filter rule is any data, criteria, and/or rule which affects the hash value generated by the hash function. For instance, generation of a hash value may include a rule that partially-expanded code based on SQL must have a hash value ending in a particular numeral. In various further embodiments, a user utilizing client device 120 to send compact code specifies a manual hash value for the corresponding expanded code before it is indexed.

In various embodiments not pictured in FIG. 2, receiving 210 compact code comprises receiving compact code conforming to a compact code size limit. Received compact code having a compact code size which does not conform to a compact code size limit causes the truncation of the non-conforming compact code into reduced-size compact code. In response truncating the non-conforming compact code into reduced-size compact code, process 200 is performed on the reduced-size compact code. In various further embodiments, the truncated compact code will be expanded into partitioned partially-expanded code or partitioned expanded code. In various embodiments, one or more hash filter rules may be applied to a hash value to transform the hash value in some way. For example, a hash filter rule may specify that a hash value used to index particular expanded code must be a hash value of a hash value. Therefore, to fulfill the hash value rule, the resulting hash value from a hash function must undergo another instance of the hash function to compute a new hash value before indexing expanded code to the next hash value.

Code Expansion Example

Figure 4:
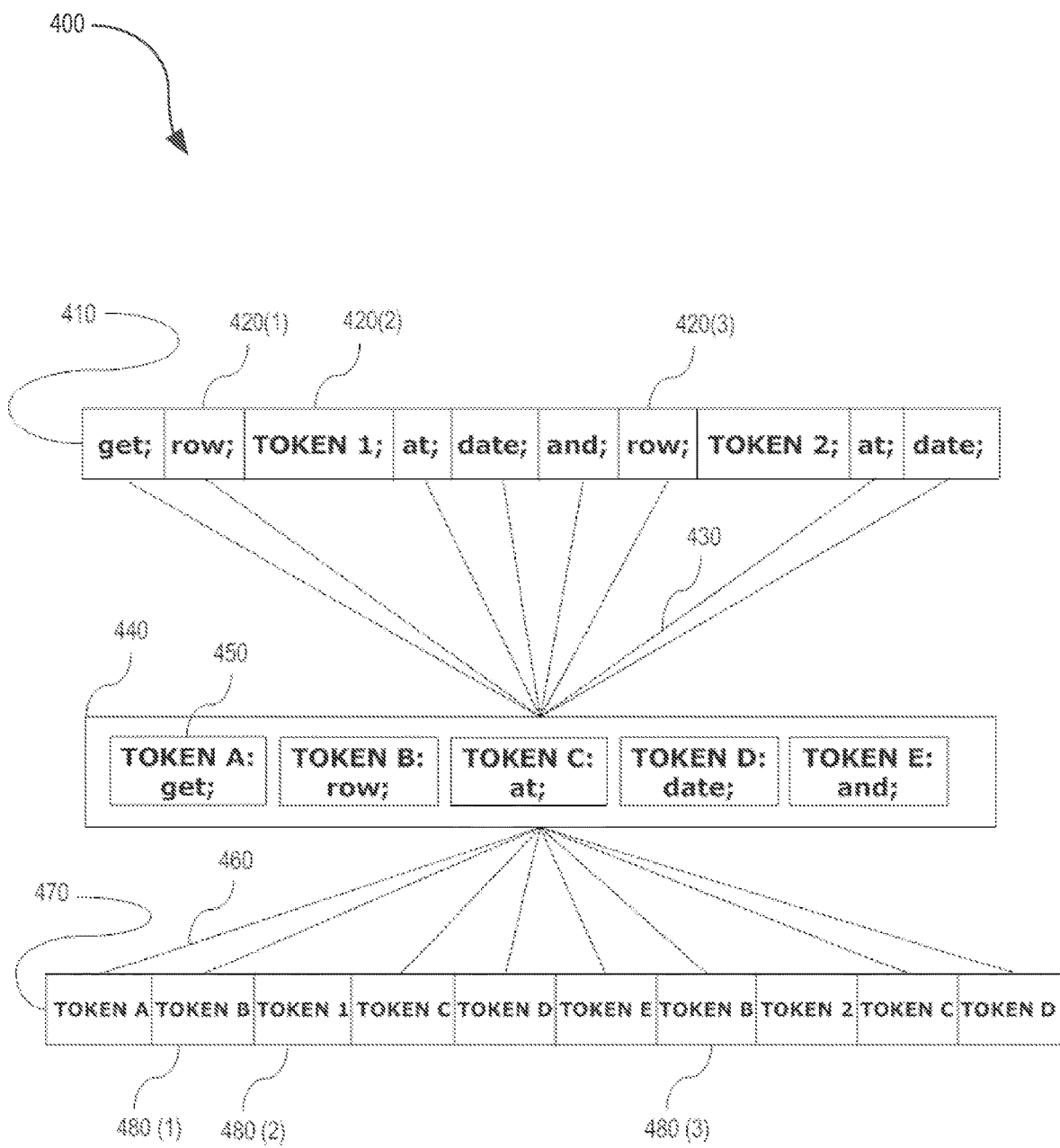
FIG. 4 illustrates an example tokenization action that may occur in the operation of an embodiment.

FIG. 4 illustrates an example tokenization action that may occur in the operation of an embodiment. In the tokenization action 400, compact code string 410 is stored in any format necessary such that the query expansion system 150 is capable of generating tokenized. Compact code string 420(1)-420(3) comprises one or more sequences of characters which are defined by the language and format that the compact code is composed with. Individual sequences of characters are separated into compact code strings 420(1)-420(3) which are groups of characters separated by a separating character, including a space character, a new-line character, a null character and/or any other character sufficient to separate sequences of characters into individual strings. Compact code string 420(1) is a string of the character sequence separated from other characters by space characters.

In various embodiments, prior to the generation 220 of tokenized code, compact code already contains one or more tokens when it is received 210. For example, compact code contains tokens which reference specific data objects inherent to a database server or other device, such as customer-specific data stored at the request of the customer. Compact code string 420(2) is a token which is part of the compact code and which exists prior to the tokenization of the compact code. Compact code string 420(3) is a string of the character sequence which is similar to compact code string 420(1).

A tokenization action begins by accessing 430 a token table 440 stored in a memory which contains at least one mapping relationship 450 which describes the correspondence between compact code strings and tokens. In various embodiments, a token table is a data structure containing rules which specify the generation or modification of tokenized code. Once the token table has been accessed and the rules for tokenization have been set, tokenized code is generated 460 by creating a new tokenized code or modifying the existing compact code to create tokenized code 470 which is a sequence of tokens in a format similar to the formatting of the compact code. Compact code string 420(1)

corresponds to TOKEN B as specified in the token table 440 and is replaced in compact code string 410 with token data 480(1) to create tokenized code 470.

Tokens already existing in the compact code string 410 prior to the tokenization process are changed according to rules specified in the token table 440 or remain unchanged in the newly generated tokenized code 470. For example, for customer tokens in the compact code relating to customer-specific data stored at the request of a customer, the query expansion system 150 leaves the customer tokens unmodified in the tokenized code for further expansion at the next step. Token data 480(2) is similar to compact code string 420(2). Token data 480(3) is similar to token data 480(1), having been derived from a similar compact code string 420(1) and undergone the same transformation rule according to the token table 440.

Figure 5A:
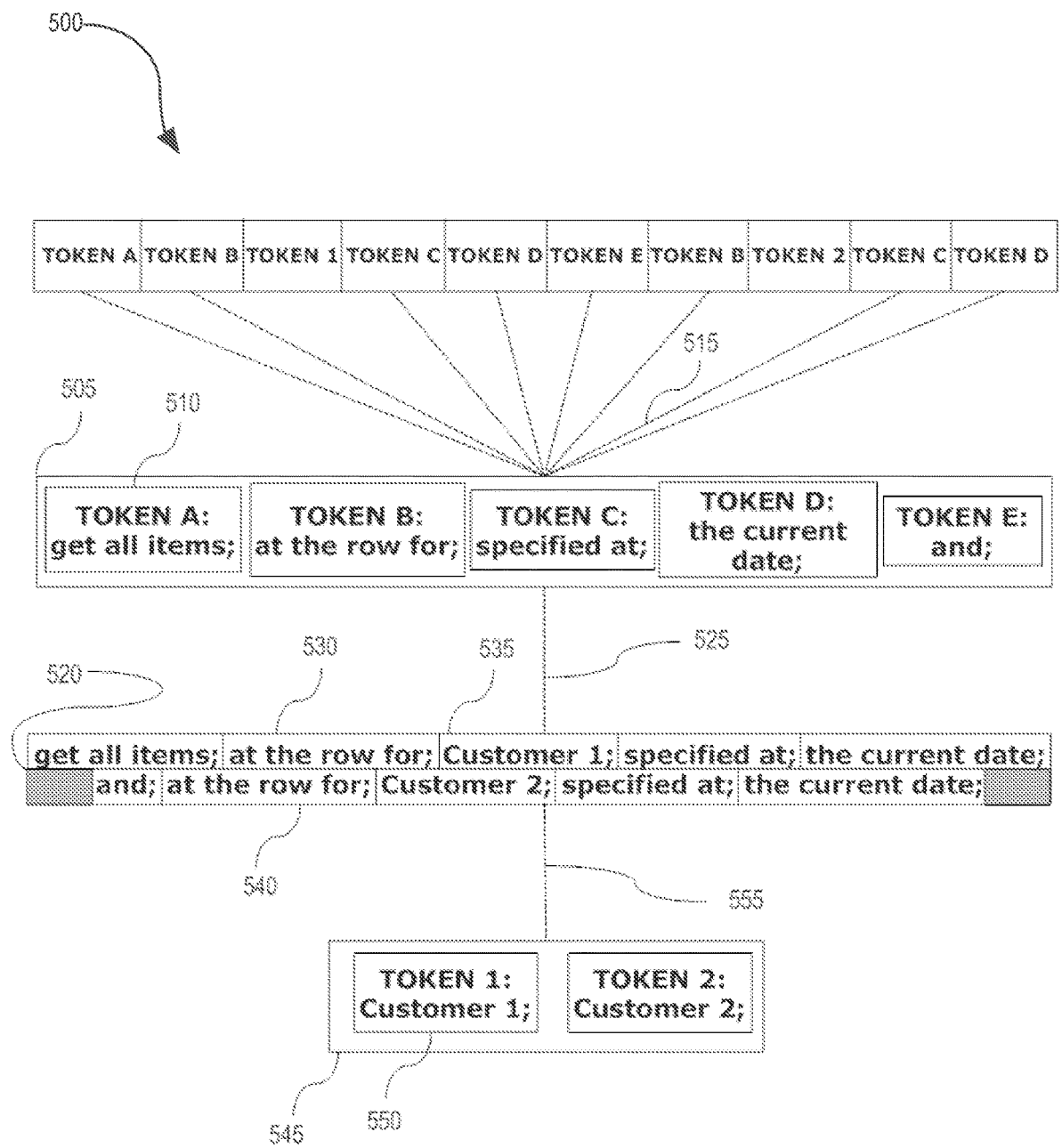
FIG. 5A illustrates an example full expansion action that may occur in the operation of an embodiment.

FIG. 5A illustrates an example full expansion action that may occur in the operation of an embodiment. In expansion action 500, the tokenized code 470 is expanded to generate expanded code 520 based on token rules specified in token expansion table 505. The expansion action begins by accessing 515 the token expansion table 505 stored in a memory which contains at least one mapping relationship 510 describing the correspondence between a token and an expanded string. In various embodiments, a token expansion table 505 is a data structure containing rules which specify the generation or modification of tokenized code. Once the token expansion table has been accessed and the rules for expansion have been set, expanded code 520 is generated 525 by creating a new expanded code or modifying the existing tokenized code to create expanded code 520 which is a sequence of expanded code strings in a format or sequent recognizable by a computing device. Parameterization allows the tokenized code to be expanded to expanded code in a format that is executable on a specific computer architecture. For example, the rules for expansion may specify that tokenized code must be expanded to expanded code which conforms to a syntactical computer programming language that is executable on a particular computer architecture.

Expanded code string 530 is a string of the expanded code comprising alphanumeric characters and separated from other expanded code strings by spacing characters such as space characters or new-line characters. Expanded code string 530 is the expanded set of characters corresponding to token data 480(1) based on the rules of token expansion table 505 and further corresponding to compact code string 420(1) based on the rules of token table 440. Expanded code string 540 similarly corresponds to token data 480(3) and compact code string 420(3) and is similar to expanded code string 530 in expanded code 520.

Token data already existing in the compact code 410 prior to the tokenization process and further existing in the tokenized code, such as token data 480(2), is also expanded according to rules specified in custom expansion table 545. For example, for customer token data in the tokenized code relating to customer-specific data stored at the request of a customer, the customer token data is replaced by a customer expanded code string from the custom expansion table. The expanding entity accesses 555 the custom expansion table 545 stored in a memory which contains at least one mapping relationship 550 which describes the correspondence between customer token data and a customer expanded code string. For example, token data 480(2) is expanded to custom expanded code 535 based on the rule specified in custom expansion table 545.

Figure 5B:
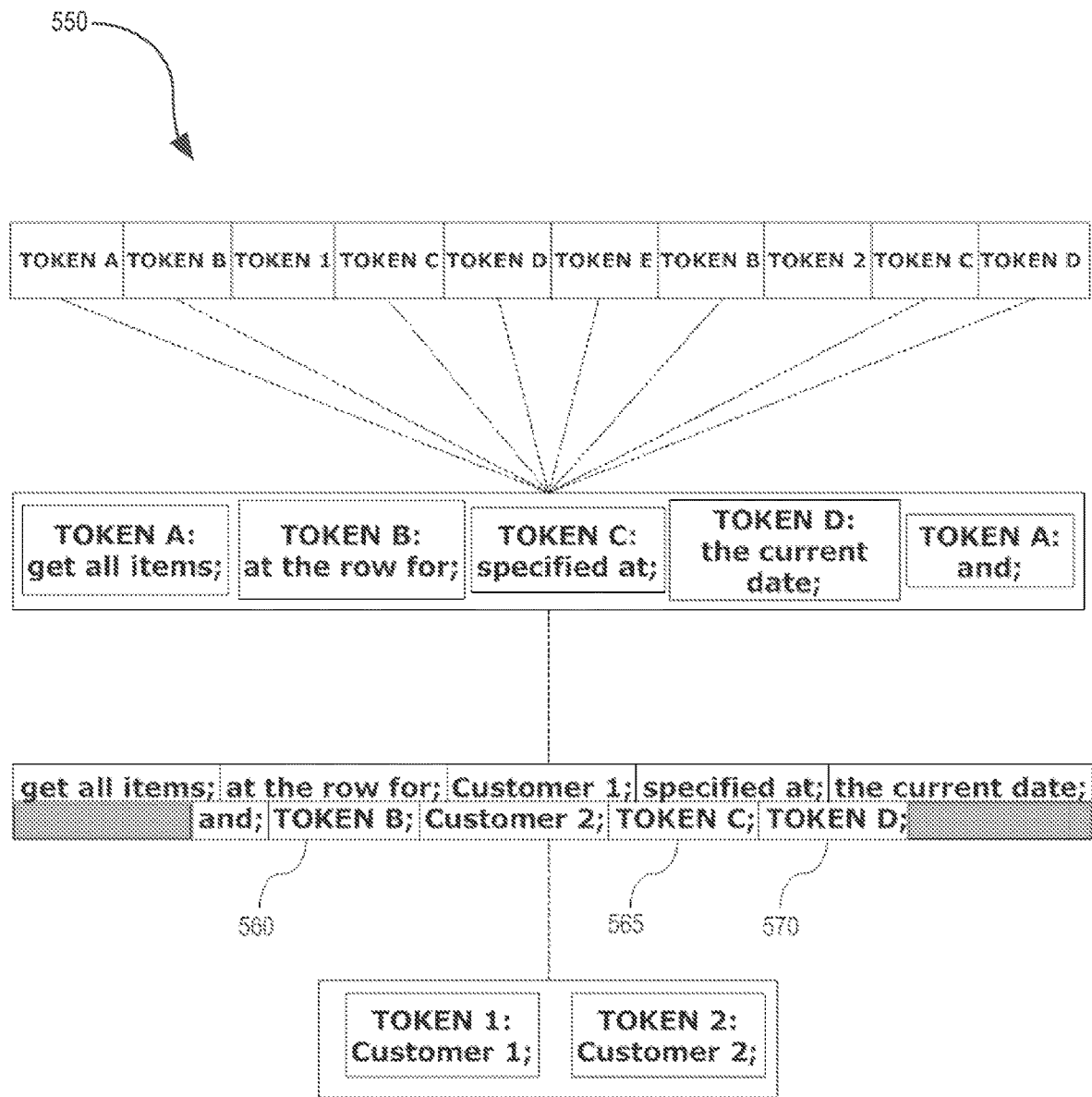
FIG. 5B illustrates an example partial expansion action that may occur in the operation of an embodiment.

FIG. 5B illustrates an example partial expansion action that may occur in the operation of an embodiment. In partial expansion action 560, the tokenized code 470 is partially expanded to generate partially-expanded code. In various embodiments, only a subset of the tokenized code is expanded to expanded code. In various further embodiments, only the first instance of a token is expanded into expanded code. For example, in a partial expansion, token data 480(3) is similar to token data 480(1), but only token data 480(1) is expanded to create expanded code string 530, while token data 480(3) is left as unexpanded token data 565. Similarly, unexpanded token data 570 and unexpanded token data 575 are examples of token data which are not the first occurrence of matching token data in a tokenized string, and therefore will not be expanded. Similar to the full expansion action discussed above, parameterization allows for the partial expansion of tokenized code using expanded strings corresponding to a specific computer architecture.

Figure 6:
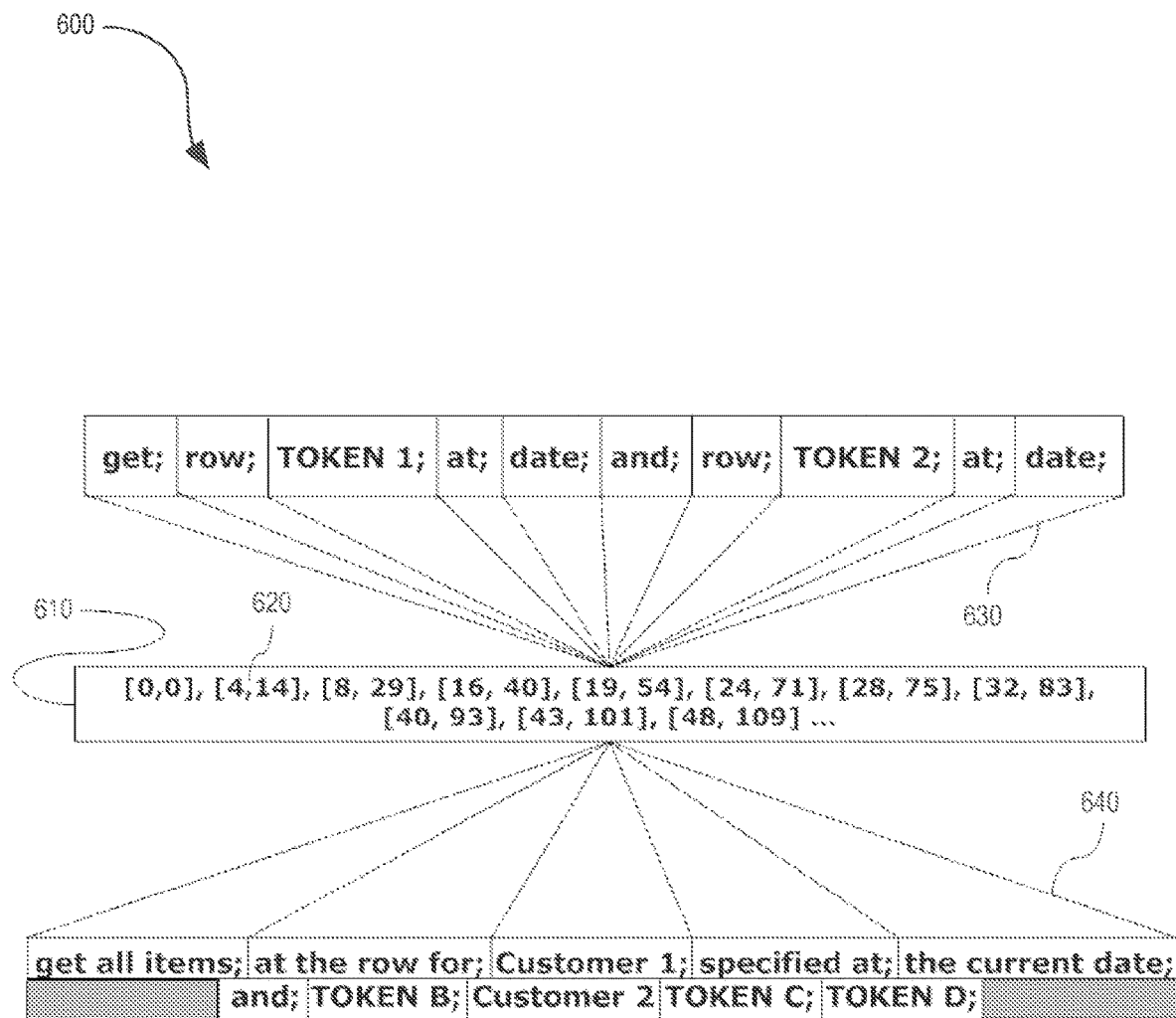
FIG. 6 illustrates an example error tracking action that may occur in the operation of an embodiment.

FIG. 6 illustrates an example error tracking action that may occur in the operation of an embodiment. In various embodiments, an entity keeps track of sequences of characters in code for reference when a process involving the code encounters an error. In various further embodiments, an entity tracks reference points corresponding to the separator characters in code such as space characters or new-line characters. The tracking of segments of code is done by storing, in an error-tracking repository 610, various pairs of two-dimensional data items or error-tracking points 620. The error tracking points comprise two distinct values, the first value relating to a tracking point in the received compact code and the second value relating to a corresponding tracking point in the generated partially-expanded code. For example, error-tracking point 620 stored in error-tracking repository 610 corresponds to a point in compact code just before compact code string 420(1) and a point in the expanded or partially-expanded code just before expanded code string 530.

In various embodiments the error-tracking repository 610 will access 630 the compact code and access 640 the expanded or partially expanded code in order to generate a set of error tracking points. In various embodiments, the error tracking repository or another entity have stored therein a datastore of offset values relating to differences in character groupings between a compact code string and a corresponding expanded code string. For example, starting at error-tracking point 620, the error-tracking repository 610 has rules stored therein which specify that expanded code string 530 comprises eleven more characters than compact code string 410. The error-tracking repository 610 then accesses the compact code string 410 and parses each compact code string for first values of the error-tracking points. The error-tracking repository then calculates the second values of the error-tracking points based on the stored offset values. In various further embodiments, both the first and second value offsets are stored in memory and error-tracking points are created based on the parsed code strings and the calculated offset of both values.

In various embodiments, the error-tracking repository 610 is accessed when an error occurs in entities which are utilizing the compact code, partially-expanded code, or expanded code. For example, a system crash on an entity parsing the compact code causes the error-tracking repository or another entity to flag the error-tracking point corresponding to the last fully parsed compact code segment according to the error-tracking repository 610. When the parsing entity recovers from the system crash, the flagging entity sends the flagged error-tracking point to the parsing entity in order to resume parsing the compact code at the point of failure, saving time and data by preventing a reparsing of the entire compact code.

In various embodiments not pictured in FIG. 6, an error in the generation of code is reported to a user device such as client device 120 which is running a client application. The errors are reported to a user at a client interface and the client interface comprises any of the error-tracking points. In various embodiments, errors will be displayed to a user at locations both in the compact code and in any expanded code. In various embodiments, an error detected by the error tracking system 600 will halt any process step of process 200 executing as part of the system. In response to resolution of the error, error tracking system 600 restarts any step of process 200.

Overview of Inter-System Transfers of Data

Techniques are described herein to improve transfer efficiency and security by preemptively identifying crucial data within a query and proceeding to transfer only that crucial data between systems. In cases where a first database system is periodically updated to remain consistent with a second database system, the first database system must regularly perform a consistency data pull to store new or updated information from the second database system. A consistency data pull is the transfer of information from the second database system to the first database system to allow the first database system to emulate the second database system as closely as possible. By utilizing queries which are designed only to retrieve the crucial data, which has been added or updated since the last consistency data pull, and preventing the transfer of extraneous data falling outside that time period, the first database system will more efficiently emulate the second database, by avoiding resource intensive sorting, copying and deleting of duplicate or unnecessary data.

By further grouping the crucial data to be transferred into an independent series of pages, the first database system can receive the crucial data while introducing multiple fail-safe measures into the transfer process. An interruption in the transfer process, whether due to a bottleneck, a crash, or a loss of power, will allow the first database to retain any full pages of data already received prior to the interruption. An intermediary data transfer system can then identify the last page of data loaded in full before the interruption, and effectively recommence the data transfer with the next full page, all without needing to restart the entire transfer process, which would waste time and valuable computer resources.

Modified Caching System

Figure 7:
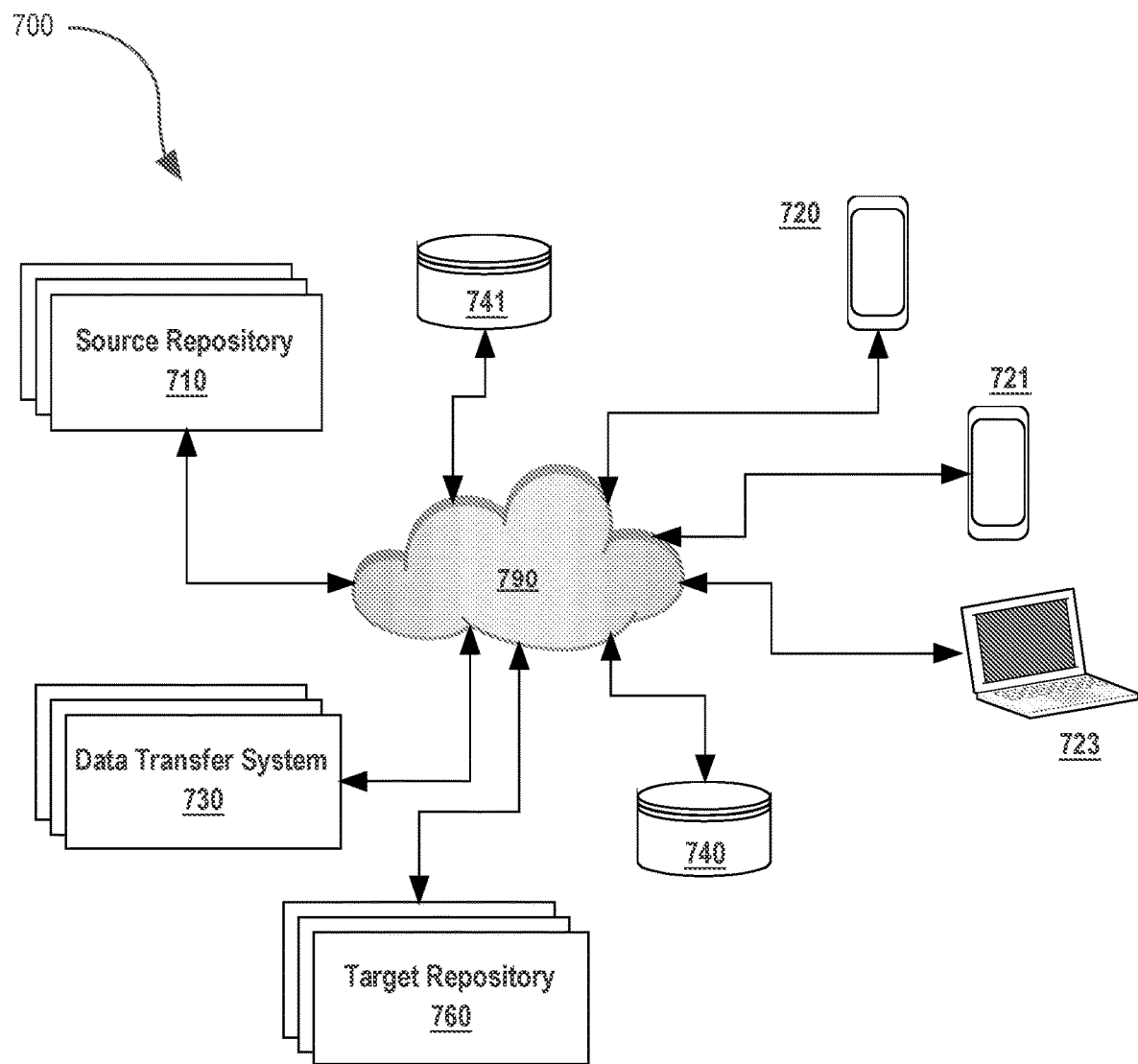
FIG. 7 illustrates a system that may be used to implement an embodiment.

FIG. 7 illustrates a system that may be used to implement an embodiment. In various embodiments, the example system 700 executes the steps of process 800, seen in FIG. 8, using multiple systems. Multiple systems 710-760 are connected by a network 790. Network 790 is any appropriate local area network, internet, and/or other type of network or communication mechanism, including those discussed herein. Coupled to network 790 is a source repository 710. As discussed above, a source repository 710 is used to store data items which are to be replicated on target repository 760. Data transfer system 730 is coupled to network 790 and performs certain intermediary steps to facilitate the transfer of data items from source repository 710 to target repository 760. In various embodiments, source repository 710, data transfer system 730 and target repository 760 are any combination of one or more hardware, software or memory systems programmed to transmit information and data as described herein.

Also depicted in system 700 are one or more network-attached storage systems 740 and 741. These storage systems 740 and 741 are used to separately store data items, pages of data items, timestamps, queries, or any other information or data relevant to process 800. As depicted in system 700, one or more user devices 720-723 are coupled to the network 790. The user devices 720-723 are used to facilitate any process or step included in process 700 by communicating with any of source repository 710, data transfer system 730, target repository 760 or storage systems 740 and 741. In various embodiments, one or more of user devices 720-723 comprise a software client device which allows a user to manually begin any of process 700 or its steps. In various embodiments, one or more of user devices 720-723 or any other device depicted in system 700 automatically executes steps, without the necessity of manual user input, to begin or continue process 800.

Modified Caching Process

Figure 8:
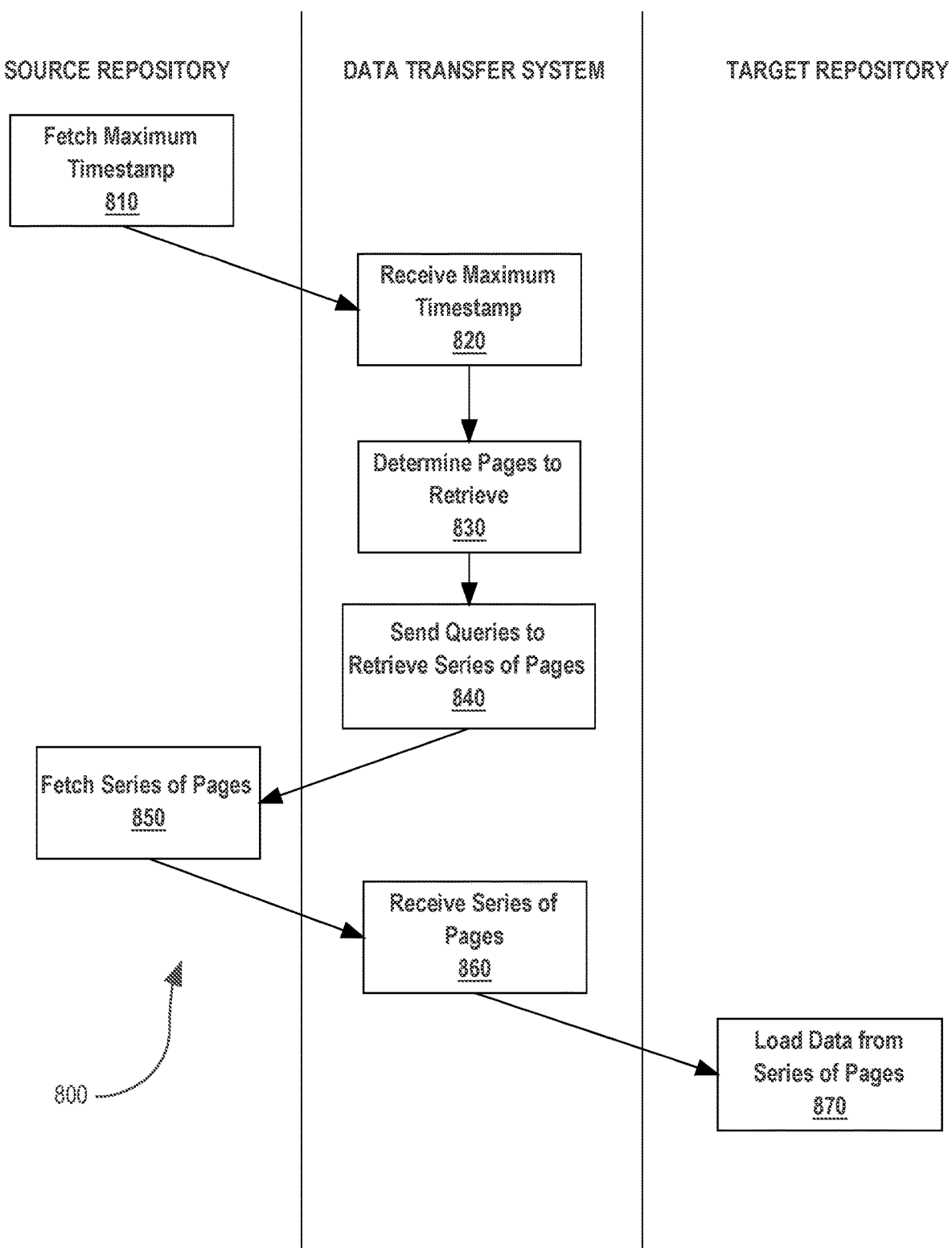
FIG. 8 illustrates an example process that may govern the operation of an embodiment.

FIG. 8 illustrates an example process that may govern the operation of an embodiment. Process 800 is a process to transfer data from the source repository 710 to the target repository 760 to promote consistency between the two repositories. At step 810, a maximum timestamp is fetched by the source repository 710. The maximum timestamp is any time data sufficient to specify a period of time which is measured from the maximum timestamp to a starting timestamp, which is a time value that the maximum timestamp was fetched in step 810. For example, if the maximum timestamp specifies the last moment in time that a previous iteration of process 800 occurred, the maximum timestamp is data or a numeric identifier specifying the period of time will be the elapsed time between the completion of the previous iteration of process 800 and the moment in time that the maximum timestamp was fetched. The subject of process 800 will then be all data stored on the source repository 710 which has been added or modified in that time period.

In various embodiments, a data transfer system 730 acts as an intermediate staging system or repository between the source repository 710 and the target repository 760. At step 820, the fetched maximum timestamp is received at the data transfer system 730. The data transfer system 730 calculates the time period between the maximum timestamp and the starting timestamp. Because the consistency data pull requires only the retrieval of data from the source repository 710 that has been added or modified to source repository 710 since the last iteration of process 800, the data transfer system 730 need only query for that data.

At step 830, a determination if made as to which data items will be retrieved from the source repository 710 based on the time period specified by the starting and maximum timestamp. Each data item in the source repository 710 has associated with it, a timestamp value. Data which has been added or modified to the source repository 710, and which has a timestamp within the calculated period, will be determined to be transferred. For example, if the last iteration of process 800 was completed exactly two days prior to the fetching 810 of the maximum timestamp, the data transfer system will resolve only to transfer to the target repository 760 information that has been added or modified to the source repository 710 within the last two days.

The transfer of data items comprises grouping the data items into pages of data. The pages are data containers to hold the data items during transfer. Data items which have been determined for retrieval by the data transfer system 730 further comprise identification numbers to assist in the grouping of data items into pages. Grouping data items into pages comprises using a range of identification numbers associated with a page to determine that a data item has an individual identification number in the page's range. In the example above, if a page can hold one thousand data items, data items having a timestamp of two days or less will be retrieved from the source repository 710 and further grouped into pages in groups of one thousand data items per page. In various embodiments, a user of the source repository and/or the data transfer system specifies the range of identification numbers which a page will contain.

At step 840, a query or a series of queries is sent to retrieve the pages of determined data items from the source repository 710. As discussed above, the queries are sent by the data transfer system 730 to the source repository 710 and specify the data items which should be grouped into pages and returned to the data transfer system 730. The queries are any data, signal, communication or any medium capable of signaling the desire to retrieve a series of pages.

At step 850, based on the reception of the query or queries for the series of pages, the series of pages is created, populated with the determined data items, and fetched by the source repository 710. At step 860 the fetched series of pages is received from the source repository 710 by the data transfer system 730.

At step 870, the received series of pages is further transferred from the data transfer system 730 and loaded into the memory of the target repository 760, thus completing the consistency data pull from the source repository to the target repository. In various embodiments comprising the fetching of multiple series of pages, steps 860 and 870 are performed concurrently for consecutive pages series. For example, as a fetched first page series is transferred 870 from the data transfer system, a second page series may be concurrently received 860 from the source repository as part of process 800.

In various embodiments not pictured in FIG. 8, transformations are performed on the data items or pages at the data transfer system 730 after they are received 860. In various further embodiments, where the data items are computer code conforming to a first programming language, the data transfer system 730 performs a language transformation operation on the computer code, modifying the computer code to conform to a second programming language before sending the pages to the target repository 760.

In various embodiments not pictured in FIG. 8, the range of identification numbers includes a padded differential value or buffered timestamp value to prevent the occurrence of errors between the pages. For example, for pages storing a maximum of one thousand data items, a first page may store all data items having unique identifiers between X and X+999 if each of those sequential data items is determined to be transferred. If the next one thousand data items are also determined to be transferred, a second page stores all data items having unique identifiers between X+998 and X+1, 998. The buffer of two data items per page may prevent data loss which occurs as a result of data corruption of packet loss during the transfer of the pages. The buffer also prevents possible page loss during long running transfers, as computer latency during a transfer operation may occasionally cause the loss of data that is to be transferred near the end of a transfer. A buffer fixes the loss due to latency by fetching possible lost pages during the next transfer operation.

In various embodiments not pictured in FIG. 8, a de-duplication step occurs in which received data items or pages are checked against previously stored data items or pages in the data transfer system 730 to identify duplicate data items. In various further embodiments, subsequent to the detection of duplicate data items, the data transfer system 730 deletes one or more instances of the duplicate data items from memory. In various embodiments, process 800 occurs at regular time intervals. In various further embodiments, process 800 occurs at time intervals specified by a user of the source repository or a user of the data transfer system by sending a manual indication to start process 800 on software client device 723.

In various embodiments not pictured in FIG. 8, a state machine monitors records each page of data transferred to the data transfer system to ensure proper facilitation of process 800. In the event of an error during the transfer of page series, the state machine will track the last full page received by the data transfer system. Upon resolution of the error, the state machine resumes sending the series of pages to the data transfer system starting with the page next in the series after the last full page to be received by the data transfer system. In various further embodiments the state machine performs a check and exercises control over the pages of data. For example, a data item having a timestamp value or a unique identifier value outside of an allowable range for a page is prevented from reaching the target repository 760 or the data transfer system 730 when the state machine detects the abnormality. As an additional example, if a source database from which data is to be transferred is unavailable, the state machine may place a transfer hold on process 800 until the source database is once again available.

In various embodiments, additional constraints are placed on the series of pages, including, but not limited to, a range of timestamps including a minimum or maximum timestamp, a range of unique identifiers including a minimum or maximum identifier, a status of the data, such as modified or newly added, or any other constraint. In various embodiments, a minimum or maximum number of pages which will be the subject of process 800 is specified and enforced.

Modified Caching Example

Figure 9:
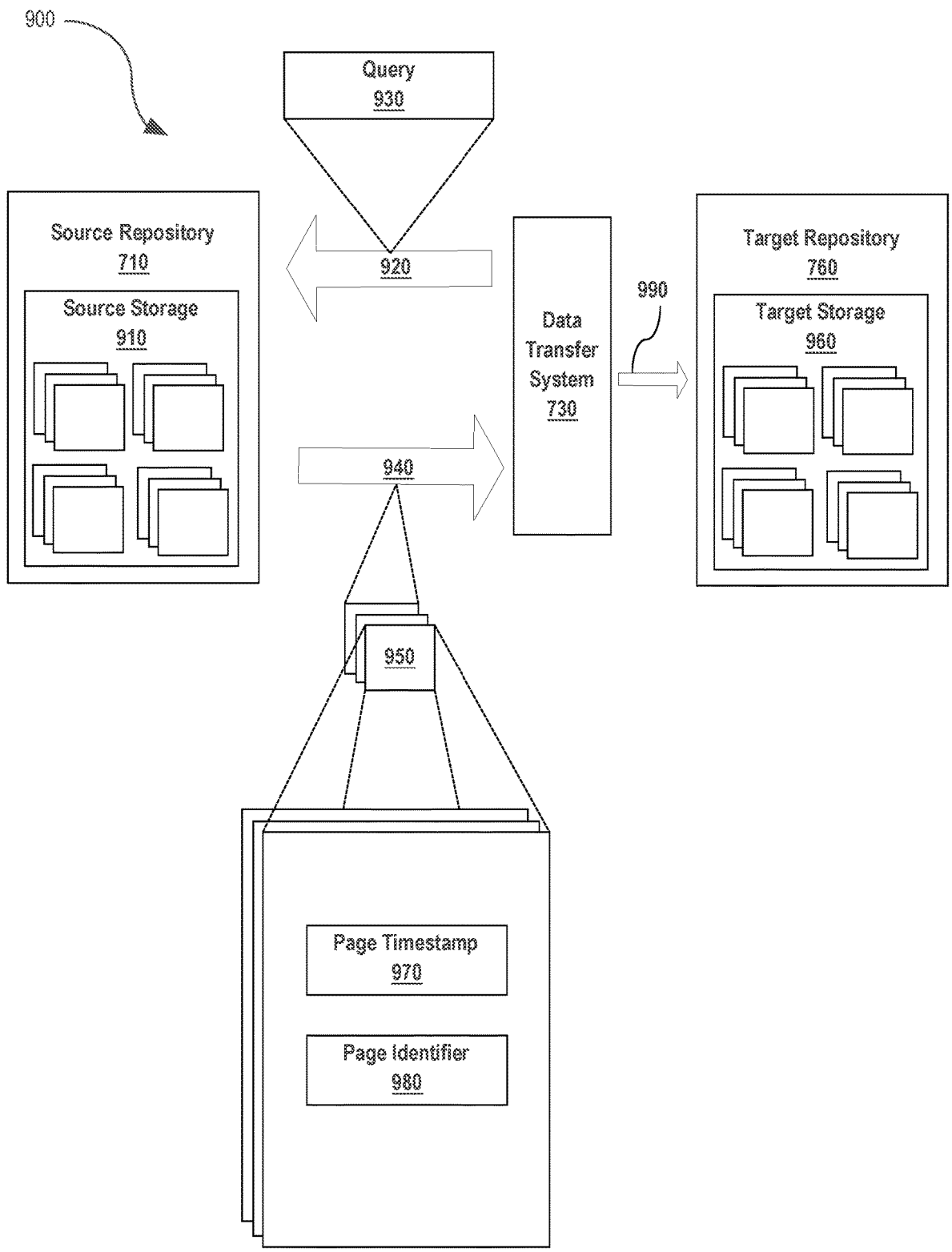
FIG. 9 illustrates an example data transfer embodiment that may occur in the operation of an embodiment.

FIG. 9 illustrates an example data transfer embodiment that may occur in the operation of an embodiment. Source repository 710 contains source storage 910. Source storage 910 is any entity, memory or system which can store data items which are the subject of the transfer of data 900. Target repository 760 contains target storage 960 which is any entity, memory, or system which can store data items which are the subject of the transfer of data 900. Data transfer system 730 communicates with source repository through outgoing communications 920 and incoming communications 940. Outgoing communications 920 include sending 840 queries to retrieve the series of pages or any other communication necessary to facilitate process 800. In various embodiments, a query 930 included in the outgoing communications 920 is any kind of data or communication sufficient to cause the sending of pages of data back to target repository.

Incoming communications 940 include the reception 820 of a maximum timestamp and/or the sending of a series of pages 950. Data transfer system 730 further sends outgoing transfer messages 990 to the target repository to store therein the received pages. Each page of the series of pages comprises a page timestamp 970 corresponding to a specific timestamp or range of timestamps determined to be retrieved by the data transfer system. Each page of the series of pages further comprises page identifier 980 which is a specific page identification value corresponding to data comprising the pages of data items.

Figure 10:
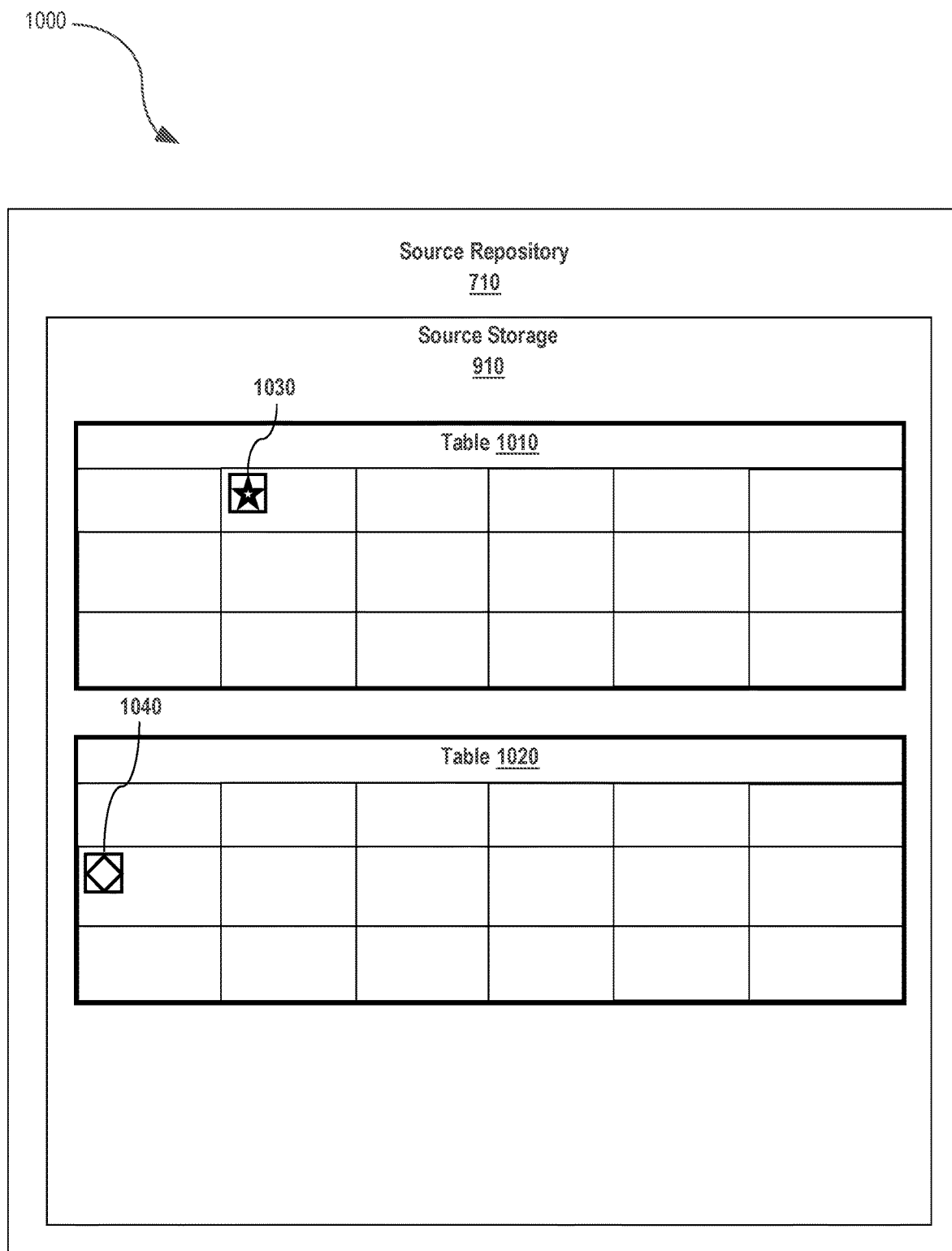
FIG. 10 illustrates a system that may be used to implement an embodiment.

FIG. 10 illustrates a system that may be used to implement an embodiment. Source repository 710 contains source storage 910. Source storage 910 comprises tables 1010-1020 of data items which are the subject of the data retrieval steps of process 800. In various embodiments, tables 1010-1020 store data items in a tabular format in which row and columns of data items are accessed in whole, in part, and/or in combination.

In various embodiments, tables in source storage 910 contain rows and columns of data items which have been flagged as having properties relevant to the determination 830 of which data items to retrieve from the source repository. For example, new flag 1030 is included in a column of table 1010 to signify that all data in the column corresponding to new flag 1030 is data that has been added during a time period coinciding with the time period specified by the maximum timestamp. In various embodiments, tables which have data items that have been modified in the time period specified by the maximum timestamp are flagged as well. For example, modified flag 1040 is included in a row of table 1020 to signify that all data in the row corresponding to the modified flag 1040 is data that has been modified in a time period corresponding with the time period specified by the maximum timestamp.

In various embodiments, determining 830 the pages to retrieve comprises selecting data for retrieval based on any combination of data items having a timestamp within the range specified by the maximum timestamp, being flagged as new data, being flagged as modified data and/or data manually selected by a device, including user device 720-723. For example, process 800 comprises steps which only retrieve items from source repository 710 to be transferred to target repository 760 which have been added or modified within a time period corresponding to the time period specified by the maximum timestamp and the starting timestamp.

In various embodiments, not pictured in FIG. 10, data items are retrieved by a data transfer system which are any combination of modified or new data items. In various embodiments, the entire contents of a source repository are sent to the data transfer system and further sent to the target repository. In various further embodiments, new data from the source repository is added to the target repository at regular intervals outside of any regular interval for sending contents of the source repository to the target repository.

Implementation Mechanisms—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 3:
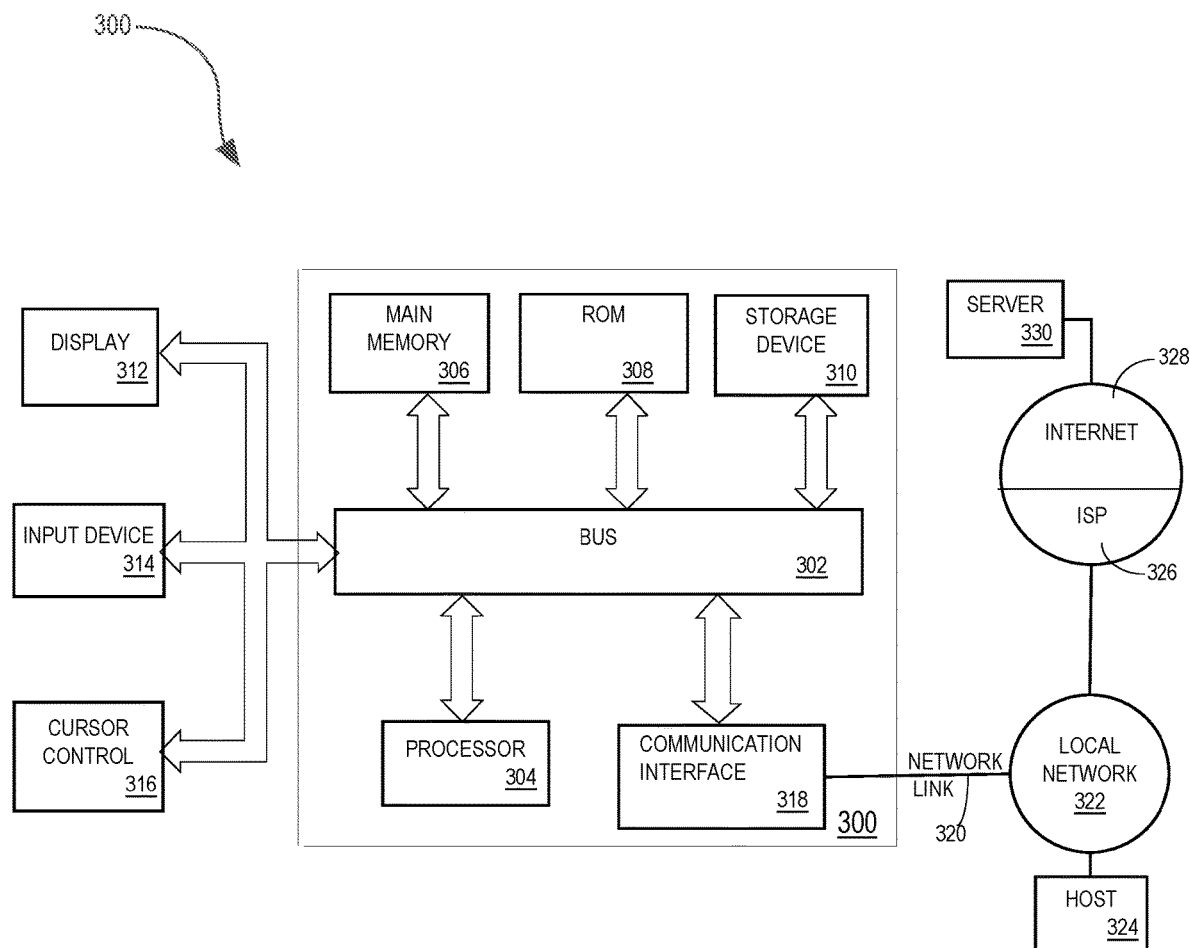
FIG. 3 illustrates an example general purpose computer system that may be used to implement aspects of an embodiment.

FIG. 3 illustrates an example general purpose computer system that may be used to implement aspects of an embodiment. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution. The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:
1. A method of hashing code, comprising:
  generating an instance of tokenized code by replacing each of at least one occurrence of a string in an instance of compact code with an instance of a token, wherein the string corresponds to an expanded string;

generating a first instance of partially-expanded code by replacing only a subset of occurrences of the string with the expanded string with respect to the instance of tokenized code;
generating a hash value based on the first instance of partially-expanded code; and
generating a hash-value-to-expanded-code index based on hash values created by applying a hash function to a plurality of second instances of partially-expanded code, wherein the first instance of partially-expanded code is determined by using the hash-value-to-expanded-code index to look up the first instance of partially-expanded code based on a hash value included in a command received from a client device.

2. The method of claim 1, wherein generating the hash-value-to-expanded-code index further comprises:
indexing the first instance of partially-expanded code in the hash-value-to-expanded-code index based on the hash value generated for the first instance of partially-expanded code.

3. The method of claim 1, wherein the hash value generated based on the first instance of partially-expanded code is a first hash value, further comprising:
generating a third instance of partially-expanded code based on a query, wherein the query includes a second instance of compact code and a command having a second hash value; and
indexing the third instance of partially-expanded in the hash-value-to-expanded-code index based on the second hash value.

4. The method of claim 1, wherein the compact code conforms to a compact code language, wherein the expanded string is a first expanded string, wherein the string further corresponds to a second expanded string, further comprising:
generating a first instance of expanded code by replacing each occurrence of the string with the first expanded string in the instance of tokenized code, wherein the first instance of expanded code conforms to a first database language supported by a first database server;
generating a second instance of expanded code by replacing each occurrence of the string with the second expanded string in the instance of tokenized code, wherein the second instance of expanded code conforms to a second database language that is different from the first database language and is supported by a second database server.

5. The method of claim 1, wherein generating the hash value further comprises:
generating an initial hash value based on the first instance of partially-expanded code; and
modifying the initial hash value based on at least one hash filter rule in order to result in the hash value.

6. The method of 1, further comprising:
determining that a size of the instance of compact code is greater than a compact code limit; and
generating an instance of reduced-size compact code by reducing the size of the instance of compact code such that the instance of reduced-size compact code is less than or equal to the compact code limit, wherein the first instance of partially-expanded code is generated by replacing only a subset of occurrences of the string with the expanded string in the reduced-size compact code.

7. The method of claim 1, wherein the instance of tokenized code includes at least one token, wherein each token corresponds to a subset of the instance of compact code.

8. The method of claim 7, wherein the at least one token is at least one first token, wherein the instance of compact code includes a plurality of second tokens, wherein generating the instance of tokenized code further comprises:
changing at least one second token of the plurality of second tokens based on a token table specifying rules for changing tokens, wherein each of the at least one second token is changed into one of the at least one first token.

9. Computer-readable storage media for transferring data from a source repository to a target repository having computer-executable instructions embodied thereon, wherein, when executed by at least one processing circuitry, the computer-executable instructions cause the at least one processing circuitry to:
generate an instance of tokenized code by replacing each of at least one occurrence of a string in an instance of compact code with an instance of a token, wherein the string corresponds to an expanded string;
generate a first instance of partially-expanded code by replacing only a subset of occurrences of the string with the expanded string with respect to the instance of tokenized code;
generate a hash value based on the first instance of partially-expanded code; and
generate a hash-value-to-expanded-code index based on hash values created by applying a hash function to a plurality of second instances of partially-expanded code, wherein the first instance of partially-expanded code is determined by using the hash-value-to-expanded-code index to look up the first instance of partially-expanded code based on a hash value included in a command received from a client device.

10. A system for hashing code, comprising:
a processing circuitry; and
a memory, the memory containing instructions that, when executed by the processing circuitry, configures the system to:
generate an instance of tokenized code by replacing each of at least one occurrence of a string in an instance of compact code with an instance of a token, wherein the string corresponds to an expanded string;
generate a first instance of partially-expanded code by replacing only a subset of occurrences of the string with the expanded string with respect to the instance of tokenized code;
generate a hash value based on the first instance of partially-expanded code; and
generate a hash-value-to-expanded-code index based on hash values created by applying a hash function to a plurality of second instances of partially-expanded code, wherein the first instance of partially-expanded code is determined by using the hash-value-to-expanded-code index to look up the first instance of partially-expanded code based on a hash value included in a command received from a client device.

11. The system of claim 10, wherein the system is further configured to:
index the first instance of partially-expanded code in the hash-value-to-expanded-code index based on the hash value generated for the first instance of partially-expanded code.

12. The system of claim 10, wherein the hash value generated based on the first instance of partially-expanded code is a first hash value, further comprising:

generating a third instance of partially-expanded code based on a query, wherein the query includes a second instance of compact code and a command having a second hash value; and indexing the third instance of partially-expanded in the hash-value-to-expanded-code index based on the second hash value.

13. The system of claim 10, wherein the compact code conforms to a compact code language, wherein the expanded string is a first expanded string, wherein the string further corresponds to a second expanded string, wherein the system is further configured to:

generate a first instance of expanded code by replacing each occurrence of the string with the first expanded string in the instance of tokenized code, wherein the first instance of expanded code conforms to a first database language supported by a first database server;

generate a second instance of expanded code by replacing each occurrence of the string with the second expanded string in the instance of tokenized code, wherein the second instance of expanded code conforms to a second database language that is different from the first database language and is supported by a second database server.

14. The system of claim 10, wherein the system is further configured to:

generating an initial hash value based on the first instance of partially-expanded code; and modifying the initial hash value based on at least one hash filter rule in order to result in the hash value.

15. The system of 10, wherein the system is further configured to:

determine that a size of the instance of compact code is greater than a compact code limit; and generate an instance of reduced-size compact code by reducing the size of the instance of compact code such that the instance of reduced-size compact code is less than or equal to the compact code limit, wherein the first instance of partially-expanded code is generated by replacing only a subset of occurrences of the string with the expanded string in the reduced-size compact code.

16. The system of claim 10, wherein the instance of tokenized code includes at least one token, wherein each token corresponds to a subset of the instance of compact code.

17. The system of claim 16, wherein the at least one token is at least one first token, wherein the instance of compact code includes a plurality of second tokens, wherein the system is further configured to:

change at least one second token of the plurality of second tokens based on a token table specifying rules for changing tokens, wherein each of the at least one second token is changed into one of the at least one first token.

* * * * *